(12) United States Patent
Robertson et al.

(10) Patent No.: US 12,308,945 B2
(45) Date of Patent: May 20, 2025

(54) STREAMING AUDIO SYNCHRONIZATION SYSTEM

(71) Applicant: White Snake Projects, Inc., Brookline, MA (US)

(72) Inventors: Jonathan C. Robertson, North Kansas City, MO (US); Cerise H. Jacobs, Brookline, MA (US); Ethan Fenn, Somerville, MA (US)

(73) Assignee: White Snake Projects, Inc., Brookline, MA (US)

( * ) Notice: Subject to any disclaimer, the term of this patent is extended or adjusted under 35 U.S.C. 154(b) by 309 days.

(21) Appl. No.: 18/122,492

(22) Filed: Mar. 16, 2023

(65) Prior Publication Data

US 2023/0370184 A1 Nov. 16, 2023

Related U.S. Application Data

(60) Provisional application No. 63/341,306, filed on May 12, 2022.

(51) Int. Cl.
| | |
|---|---|
| *G11B 11/00* | (2006.01) |
| *G06F 3/16* | (2006.01) |
| *G11B 27/34* | (2006.01) |
| *H04H 20/88* | (2008.01) |
| *H04S 1/00* | (2006.01) |

(52) U.S. Cl.
CPC .............. *H04H 20/88* (2013.01); *G06F 3/162* (2013.01); *G11B 27/34* (2013.01); *H04S 1/007* (2013.01)

(58) Field of Classification Search
CPC ......... H04H 20/88; G06F 3/162; G11B 27/34; H04S 1/007

USPC .............................. 381/2, 23, 307, 103, 119
See application file for complete search history.

(56) References Cited

U.S. PATENT DOCUMENTS

| | | | | |
|---|---|---|---|---|
| 6,332,147 B1* | 12/2001 | Moran | ................... | G06F 16/489 |
| | | | | 715/231 |
| 6,611,537 B1* | 8/2003 | Edens | ................ | H04N 21/4363 |
| | | | | 375/E7.274 |
| 7,490,169 B1* | 2/2009 | Ogdon | ................... | H04L 65/612 |
| | | | | 709/248 |
| 8,595,342 B2* | 11/2013 | Igelman | ................ | H04L 65/611 |
| | | | | 715/201 |
| 10,789,920 B1* | 9/2020 | Dolder | ................. | G10H 1/0066 |
| 2004/0226047 A1* | 11/2004 | Lin | ..................... | H04N 21/4788 |
| | | | | 348/E7.083 |
| 2006/0156374 A1* | 7/2006 | Hu | ...................... | H04N 21/4305 |
| | | | | 725/135 |

(Continued)

*Primary Examiner* — William J Deane, Jr.
(74) *Attorney, Agent, or Firm* — Morse, Barnes-Brown & Pendleton, P.C.; Sean D. Detweiler, Esq.

(57) ABSTRACT

A method and apparatus for synchronizing audio streamed over a network. The system makes use of a reference track and a common clock that is provided by a server to all participating performers. The performers perform along with and to the reference track wherein the reference track and common clock serve as a baseline reference for all the performers in regard to their audio transmitted to the server. Using the reference track and common clock, the server of the system can reconstruct and synchronize received audio from all the participating performers. The synchronized audio is then provided to a mixer where it is combined and live or real-time adjustments to the audio are made before being provided for broadcast.

22 Claims, 7 Drawing Sheets

(56) References Cited

U.S. PATENT DOCUMENTS

| | | |
|---|---|---|
| 2009/0310027 A1 | 12/2009 | Fleming |
| 2013/0104166 A1* | 4/2013 | Shah ................ H04N 21/2408 |
| | | 725/32 |
| 2018/0329671 A1* | 11/2018 | Einziger .................. G06F 3/00 |
| 2019/0334716 A1* | 10/2019 | Kocsis .................. G06N 3/045 |
| 2023/0247074 A1* | 8/2023 | Bhatt .................. H04L 65/612 |
| | | 709/248 |

* cited by examiner

STREAMING AUDIO SYNCHRONIZATION SYSTEM

CROSS-REFERENCE TO RELATED APPLICATION(S)

This application claims priority to, and the benefit of, co-pending U.S. Provisional Application 63/341,306, filed May 12, 2022, for all subject matter common to both applications. The disclosure of said provisional application is hereby incorporated by reference in its entirety.

FIELD OF THE INVENTION

The present invention relates to streaming synchronization. In particular, the present invention relates to a system that is capable of synchronizing audio streams and combining the synchronized streams for broadcast in near-real-time.

BACKGROUND

Generally, synchronizing audio from multiple sources across the internet poses an issue as the protocols that serve as the foundation for internet or network communication are focused on making sure the information sent and received from an individual source is provided in the correct order to ensure proper communication. Typically, the information is transmitted using packets that are generated and sent as the information is generated. However, because of the nature of internet communication (including varying distances and network speeds, and quality of connectivity), packets can be delayed and may not be received in the order that they are sent, or even be received at all. The protocols account for this and include a mechanism for reconstructing the information with out-of-order or missing data. In some such cases, the reconstruction can cause delay. Typical such introduced delay does not adversely impact the receipt of the information.

However, this experiences some shortcomings. In cases where there are multiple parties interacting over the internet or communication network in near-real-time, the delays and or loss of data can become noticeable between the parties. This can further be exasperated as if the parties are trying to synchronize their interactions in a time-sensitive manner, such as performing together in a live or real-time performance involving audio. Such synchronization becomes even more difficult as the number of parties participating increases as each party may be at different distances from each other, have different data speeds, or have different quality of connectivity.

SUMMARY

There is a need for a system that is capable of synchronizing audio transmitted over a network such that the audio can be combined and broadcast as a collaborative performance between the performers participating. The present invention is directed toward further solutions to address this need, in addition to having other desirable characteristics. The system makes use of a reference track and a common clock that is provided by a server to all participating performers. The performers perform along with and to the reference track wherein the reference track and common clock serve as a baseline reference for all the performers in regard to their audio transmitted to the server. Using the reference track and common clock, the server of the system can reconstruct and synchronize received audio from all the participating performers. The synchronized audio is then provided to a mixer where it is combined and live or real-time adjustments to the audio are made before being provided for broadcast.

In accordance with example embodiments of the present invention, a streaming synchronization system is provided. The streaming synchronization system includes a server, one or more performer-clients, and a mixer-client. The server is in communication with server data storage and a library containing one or more reference tracks and includes a server processor and a server clock. The one or more performer-clients include a performer-client processor and a performer-client clock. Each of the one or more performer-clients is in communication with the server, a performer-microphone and audio interface supplying performer audio data and is configured to receive and store a reference track from the server. The mixer-client includes a mixer-client processor and a mixer-client clock. The mixer-client is in communication with the server and manages synchronization of the performer audio data from the one or more performer-clients into a performance track and a broadcast track. Each of the one or more performer-clients receives a reference track from the server. One of the one or more performer-clients sends a start signal to the server and the server in response sends a start signal to each of the one or more performer-clients including a start-time stamp provided by the server clock. In response to receiving a start signal from the server, each of the one or more performer-clients starts playback of the received reference track and receives audio data synched to the reference track and transmits the audio data to the server, the transmitted audio data including the start-time stamp from the server, a time stamp from the performer-client, and an indication of a temporal position of the audio data in reference to the reference track. The server receives and forwards the audio data received from the one or more performer-clients to the mixer-client. The mixer-client stores the audio data from each of the one or more performer-clients in a playback-buffer. The audio data from each buffer is combined into a performance track at the mixer-client in such a way that the start-time stamp from the server, a time stamp from the performer-client, and an indication of a temporal position of the audio data in reference to the reference track are in alignment. The mixer-client then transforms the performance track into a broadcast track.

In accordance with aspects of the present invention, the audio data comprises user datagram protocol (UDP) packets.

In accordance with aspects of the present invention, the mixer-client manages synchronization by introducing a playback buffer based on the time stamps.

In accordance with aspects of the present invention, the mixer-client comprises one or more plugins for channels on a digital audio workstation (DAW).

In accordance with aspects of the present invention, the mixer-client receives additional audio data that is combined with the performance track.

In accordance with aspects of the present invention, the mixer-client receives one or more control messages that are combined with the performance track.

In accordance with aspects of the present invention, the one or more performer-clients comprises at least a first performer-client and a second performer-client.

In accordance with aspects of the present invention, transforming a performance track into a broadcast track comprises creating a stereo mix of the performance track.

In accordance with aspects of the present invention, the transformation of the performance track into the broadcast track makes use of a buffer.

In accordance with aspects of the present invention, the broadcast track is outputted by the mixer-client.

In accordance with aspects of the present invention, the synchronizing, combining, and transforming of supplied audio data from the one or more performer-clients into the broadcast stream occurs in near real-time with minimal delay.

In accordance with example embodiments of the present invention, a method for synchronizing audio streams is provided. The method includes providing a server in communication with server data storage and a library containing one or more reference tracks and including a server processor and server clock; providing one or more performer-clients including a performer-client processor and a performer-client clock, wherein each of the one or more performer-clients is in communication with the server, a performer-microphone and audio interface supplying performer audio data; and configured to receive and store a reference track from the server; providing a mixer-client including a mixer-client processor and a mixer-client clock, wherein the mixer-client is in communication with the server and manages synchronization of the performer audio data from the one or more performer-clients into a performance track and a broadcast track; receiving, by each of the one or more performer-clients, a reference track from the server; sending, from one of the one or more performer-clients, a start signal to the server; sending, by the server in response a received start signal, a start signal to each of the one or more performer-clients including a start-time stamp provided by the server clock; starting, by each of the one or more performer-clients, in response to receiving a start signal from the server, playback of the received reference track and receiving audio data synched to the reference track; transmitting the audio data from the one or more performer-clients to the server, the transmitted audio data including the start-time stamp from the server, a time stamp from the performer-client, and an indication of a temporal position of the audio data in reference to the reference track; receiving, by the server, the audio data from the one or more performer-clients; forwarding, by the server, the audio data from the one or more performer-clients to the mixer-client; storing, by the mixer-client, the audio data from each of the one or more performer-clients forwarded by the server in a playback-buffer; combining, at the mixer-client, the audio data from each buffer into a performance track in such a way that the start-time stamp from the server, a time stamp from the performer-client, and an indication of a temporal position of the audio data in reference to the reference track are in alignment; and transforming, by the mixer-client, the performance track into a broadcast track.

In accordance with aspects of the present invention, audio data comprises user datagram protocol (UDP) packets.

In accordance with aspects of the present invention, the mixer-client manages synchronization by introducing a playback buffer based on the time stamps.

In accordance with aspects of the present invention, the mixer-client comprises one or more plugins for channels on a digital audio workstation (DAW).

In accordance with aspects of the present invention, the method further includes the mixer-client receiving additional audio data that is combined with the performance track.

In accordance with aspects of the present invention, the method further includes the mixer-client receiving one or more control messages that are combined with the performance track.

In accordance with aspects of the present invention, the one or more performer-clients comprises at least a first performer-client and a second performer-client.

In accordance with aspects of the present invention, transforming a performance track into a broadcast track comprises creating a stereo mix of the performance track.

In accordance with aspects of the present invention, transforming the performance track into the broadcast track makes use of a buffer.

In accordance with aspects of the present invention, the method further includes the mixer-client outputting the broadcast track.

In accordance with aspects of the present invention, the synchronizing, combining, and transforming of supplied audio data from the one or more performer-clients into the broadcast stream occurs in near real-time with minimal delay.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
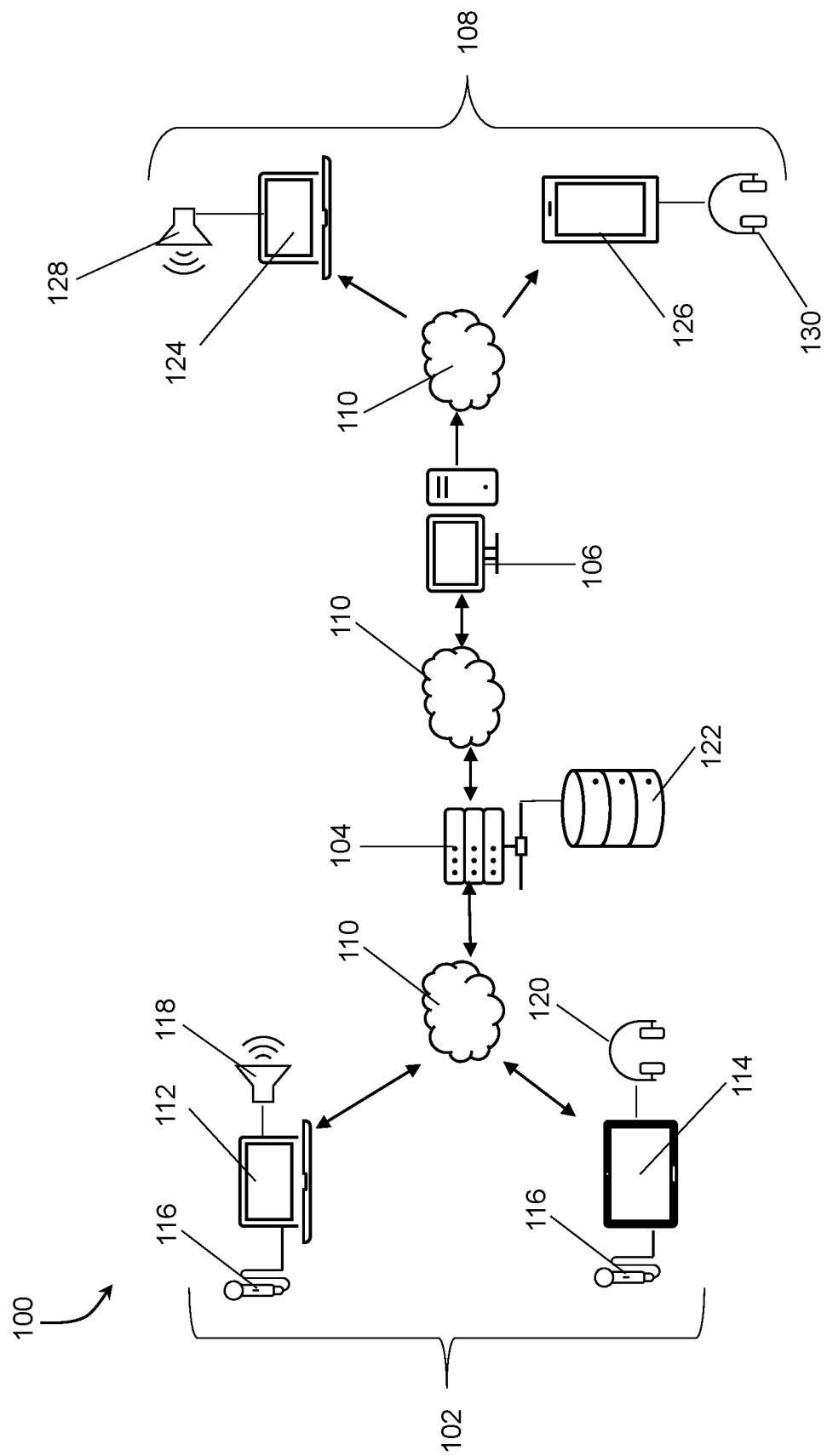
FIG. 1 is an example environment in which a system for synchronizing audio streams can be implemented in accordance with embodiments of the present invention.

An illustrative embodiment of the present invention relates to a system and method for synchronizing streaming audio from performers provided over a network connection such that the streamed audio can be combined, adjusted, and broadcast in near real-time with minimal delay.

FIG. 1 through FIG. 4 wherein like parts are designated by like reference numerals throughout, illustrate an example embodiment or embodiments of a system and method for synchronizing audio streams, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed, such as the size, shape, or type of elements or materials, in a manner still in keeping with the spirit and scope of the present invention.

FIG. 1 depicts an example network environment 100 in which the synchronization of audio streams of the present invention is performed. In this environment, there are one or more performer devices 102, a server 104, a mixer device 106, and one or more listener devices 108 which are in communication over a network 110 such as the internet.

The performer devices 102 can include any number of suitable electronic devices, such as personal computers 112 or other smart devices, such as tablets 114 that are capable of operating as a performer-client providing, performer-client processer, a performer-client clock, an audio interface, and network or internet connectivity. The performer devices 102 also have, or are connected to, input and output devices such as microphones 116, speakers 118, or headphones 120 that allow for the recording and playback of audio on the performer-client device using the audio interface. Other possible implementations will be apparent to one skilled in the art given the benefit of this disclosure.

The server 104 can include any number of suitable electronic devices that are capable of operating as a live server providing a server processor, a server clock, and network or internet connectivity. In certain embodiments, the server 104 is in communication with a server data storage 122 having a library containing one or more reference tracks. Other possible implementations will be apparent to one skilled in the art given the benefit of this disclosure.

The mixer device 106 can include any number of suitable electronic devices that are capable of operating as a mixer-client providing a mixer-client processor, mixer-client clock, audio mixing capabilities, and network or internet connectivity. In certain embodiments, the mixer device 106 comprises a Digital Audio Workstation (DAW) implemented in software, hardware, or a combination thereof. Examples of DAWs include Pro Tools by Avid™, Logic Pro by Apple™, Adobe Audition by Adobe™, Audacity, and FL studios. Other possible implementations will be apparent to one skilled in the art given the benefit of this disclosure.

The listener devices 108 can include any number of suitable electronic devices, such as personal computers 124 or other smart devices, such as a smartphone 126, that are capable of receiving and playing a broadcast audio stream. The listener devices 108 devices also have, or are connected to, output devices such as speakers 128, or headphones 130 that allow for the playback of audio on the listener device 108. Other possible implementations will be apparent to one skilled in the art given the benefit of this disclosure.

The communication network 110, provides the network connectivity between the various components 102, 104, 106, and 108 of the system, allowing the components to communicate with each other. While, in this example, the network connectivity between the components 102, 104, 106, and 108 of the network environment 100 is the internet, it will be understood by one skilled in the art that other types of networks or connectivity can be used.

FIGS. 2A-2D depict the functionality and interaction of the components of the system 200 for synchronizing streaming audio. At its base, system 200 involves the operation of one or more performer-clients 202, a live server 204, and a mixer-client 206. These components can be implemented with software and/or hardware using the components 102, 104, and 106 respectfully from FIG. 1.

Figure 2A:
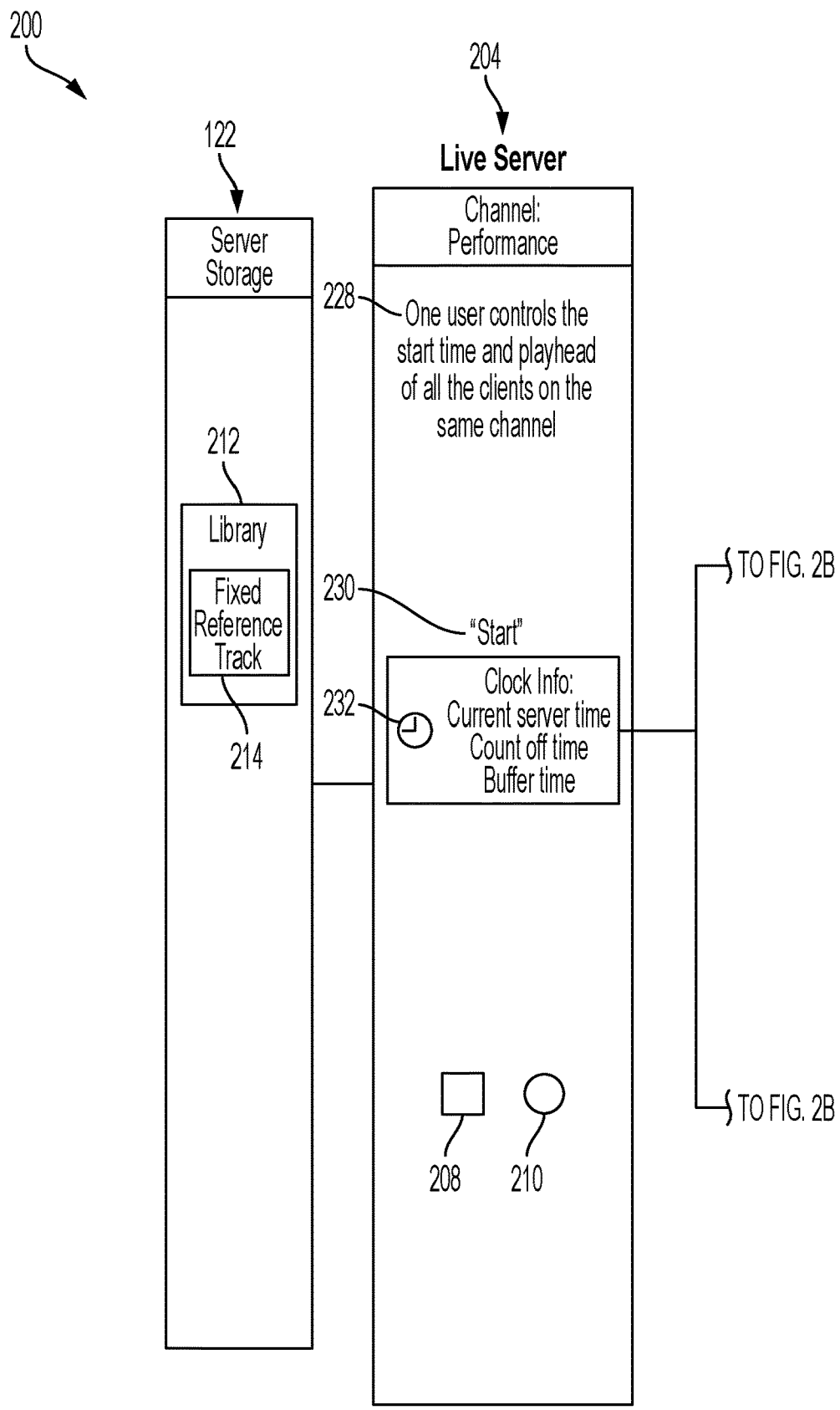
FIGS. 2A, 2B, 2C, and 2D depict an example embodiment of a system for synchronizing audio streams in accordance with embodiments of the present invention.
Figure 2B:
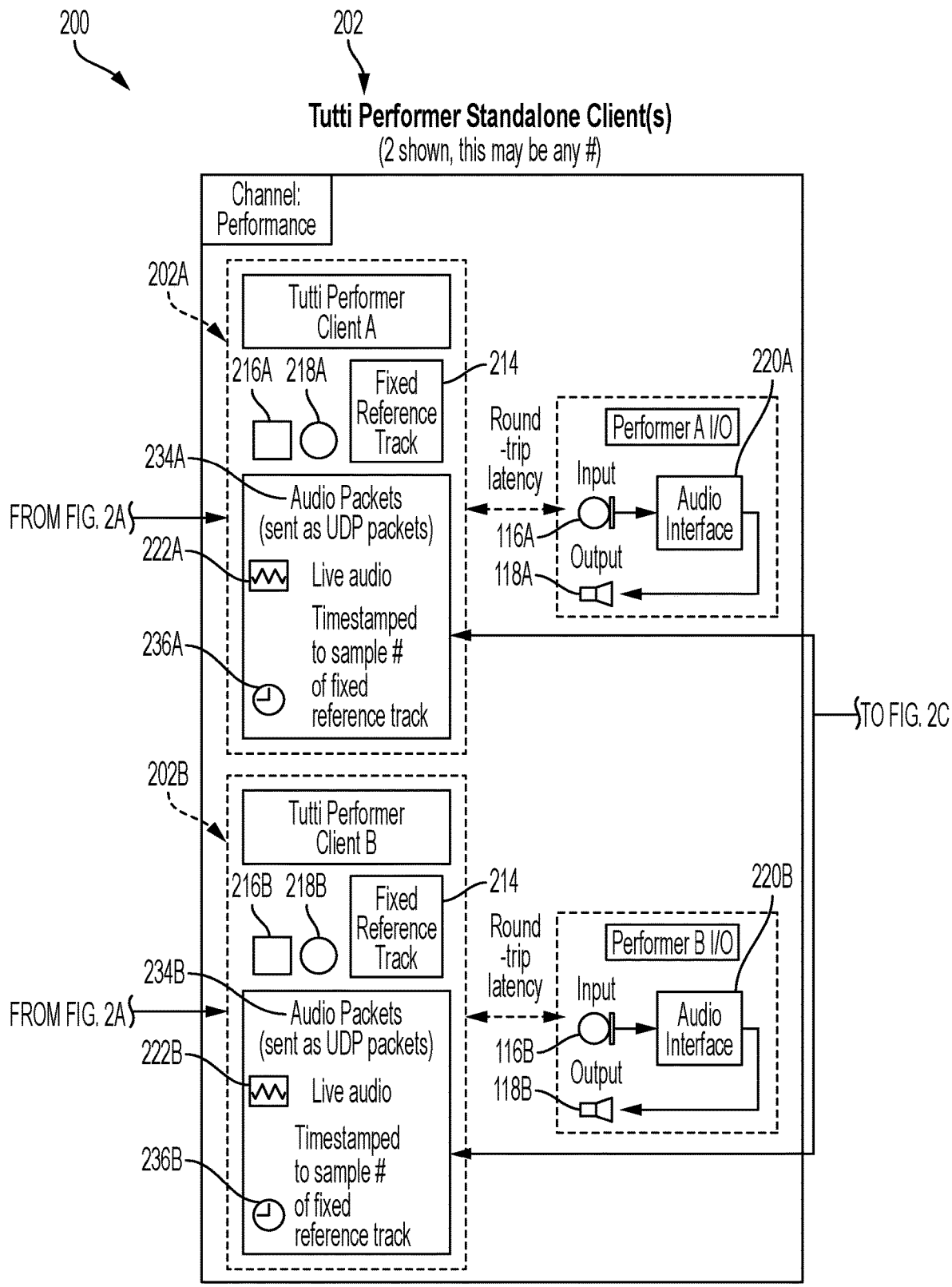
Figure 2C:
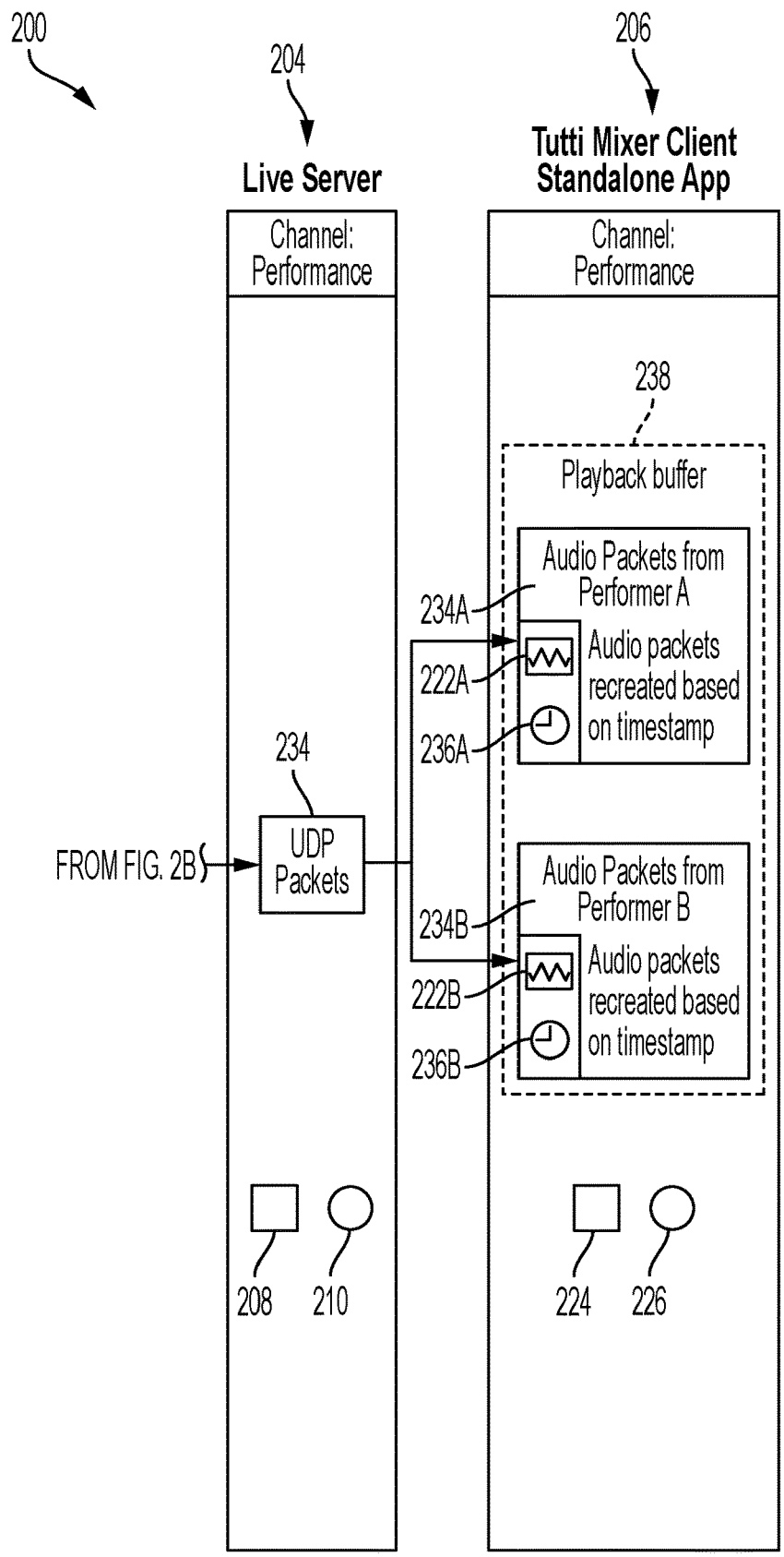
Figure 2D:
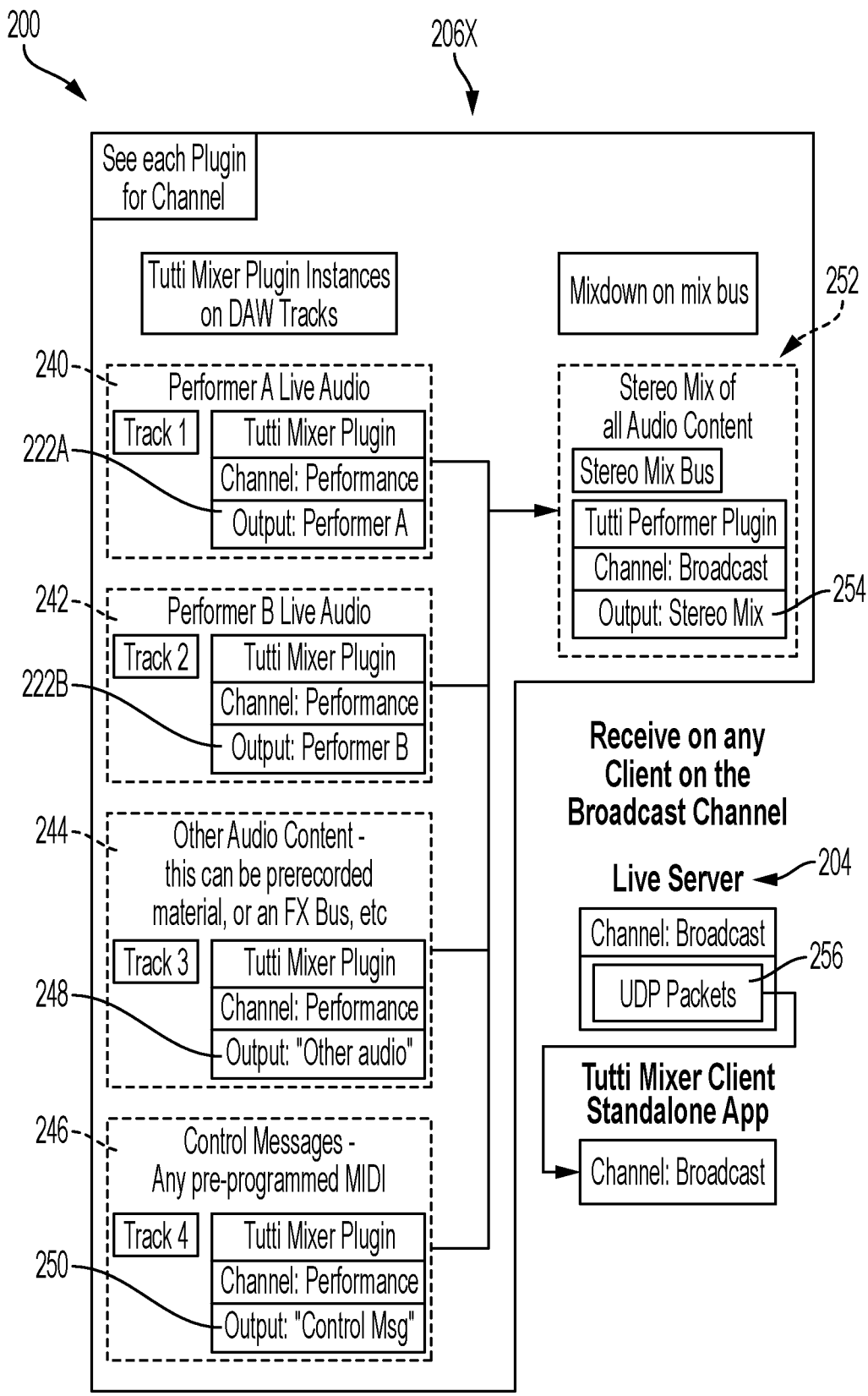
Figure 3:
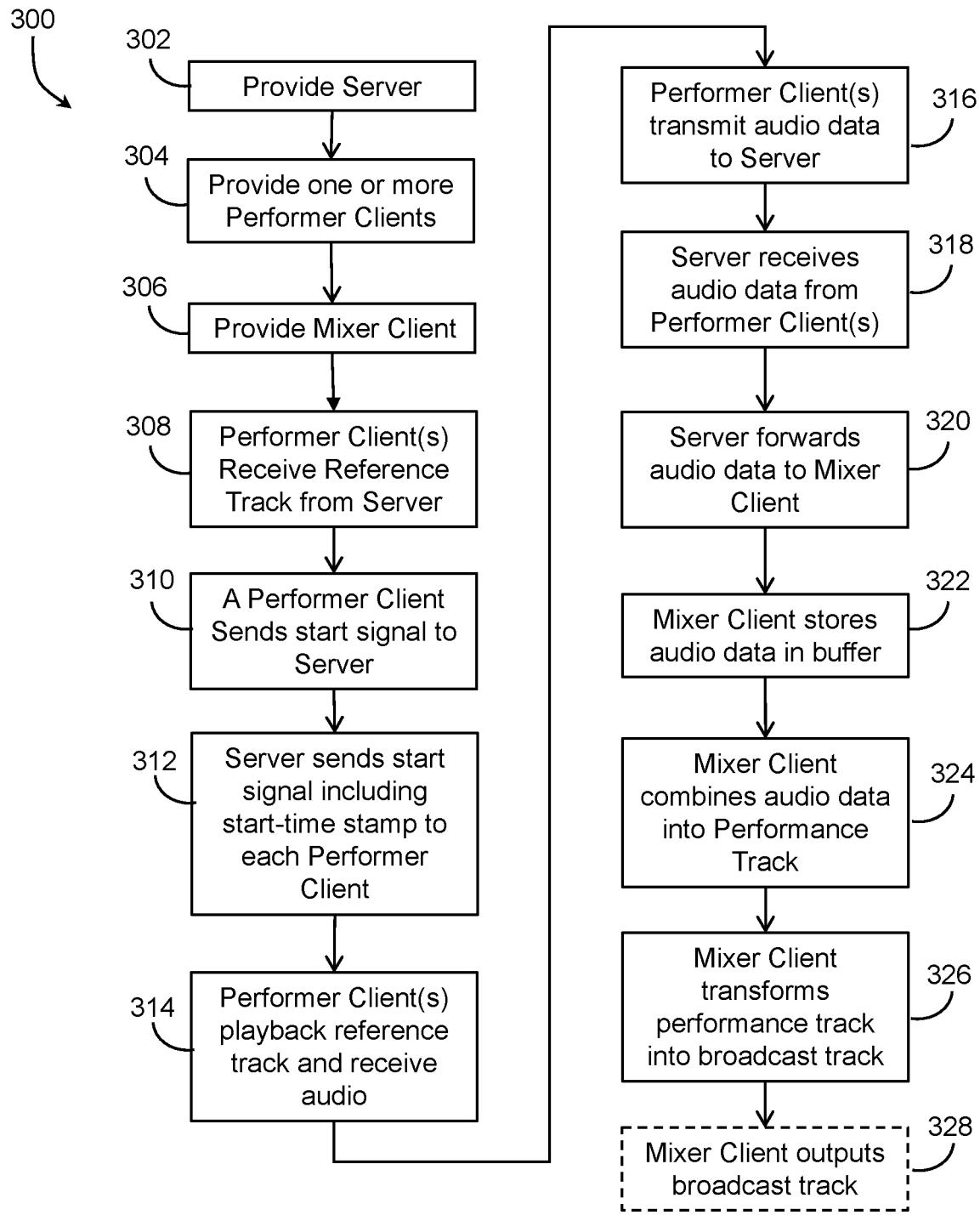
FIG. 3 is a flow diagram of a methodology for synchronizing audio streams in accordance with embodiments of the present invention.

The operation of system 200 is set forth in flow diagram 300 of FIG. 3. This methodology will be described in conjunction with the operation of the components set forth in FIGS. 2A-2D.

In Step 302, a server 204 is provided as shown in FIG. 2A. The live server 204 includes a server processor 208 and a server clock 210 and is in communication with server data storage 122 and a library 212 containing one or more reference tracks 214.

In step 304, one or more performer-clients are provided. In the example of FIG. 2B, there is a first performer-client 202A and a second performer-client 202B. Each performer-client 202A, 202B includes a performer-client processor 216A, 216B and a performer-client clock 218A, 218B. Each of the one or more performer-clients 202A, 202B is in communication with the live server 204, a performer-microphone 116A, 116B and audio interface 220A, 220B, supplying performer audio data 222A, 222B; and configured to receive and store a reference track 214 from the live server 204.

In step 306, a mixer-client 206 is provided. The mixer-client 206, as shown in FIG. 2C, includes a mixer-client processor 224 and a mixer-client clock 226. The mixer-client 206 is in communication with the live server 204 and manages the synchronization of the performer audio data from the one or more performer-clients into a performance track and a broadcast track. In certain embodiments, the mixer-client 206 comprises one or more plugins for channels on a digital audio workstation (DAW). An example of this can be seen in Block 206X in FIG. 2D. Here there are four (4) channels 240, 242, 244, and 246, each with a separate plugin for the channel. The first channel 240 deals with the streaming audio data 222A from the first performer-client 202A. The second channel 242 deals with the audio data 222B from the second performer-client 202B. The third channel 244 deals with other audio 248, such as pre-recorded material or sound effects. The fourth channel 246 deals with control messages 250, such as pre-programmed Musical Instrument Digital Interface (MIDI)

These first three steps (Steps 302, 304, and 306) provide the components of the system 200 that enable the synchronization of streaming audio as set forth herein. The rest of the steps detail the operation and interaction of the components of the system 200 which in FIGS. 2A-2D flows from the left side toward the right side across the figures.

In step 308, each of the one or more performer-clients 202A, 202B, as shown in FIG. 2B, receives a reference track 214 from the server 204, as shown in FIG. 2A. The reference tracks 214 can be sent to the one or more clients 202A, 202B from the server 204, or the one or more performer-clients 202A, 202B can download the reference track from the live server 204.

In step 310, one of the one or more performer-clients 202A, 202B, as shown in FIG. 2B, sends a start signal 228 to the live server 204, as shown in FIG. 2A.

In step 312, live server 204, as seen in FIG. 2A, in response sends a start signal 230 to each of the one or more performer-clients 202A, 202B, as seen in FIG. 2B, including a start-time stamp 232 provided by the server clock 210.

In step 314, in response to receiving a start signal 230 from the live server 204, as seen in FIG. 2A, each of the one or more performer-clients 202A, 202B, as seen in FIG. 2B, starts playback of the received reference track 214 and receives audio data 222A, 222B synched to the reference track 214

In step 316, the one or more performer-clients 202A, 202B, as seen in FIG. 2B, transmit the audio data 222A, 222B to the live server 204, as seen in FIG. 2C. The transmitted audio data 234A, 234B including the start-time stamp 232A, 232B from the live server 204, as well as a time stamp from the performer-client 202A, 202B and an indication of a temporal position 236A, 236B of the audio data 222A, 222B in reference to the reference track 214. In certain embodiments, the transmitted audio data 234A, 234B comprises user datagram protocol (UDP) packets.

In step 318, the live server 202 receives the transmitted audio data 234 from the one or more performer-clients 202A, 202B, as seen in FIG. 2C.

In step 320, the live server 202 forwards the audio data 234 to the mixer-client 206, as seen in FIG. 2C.

In step 322, the mixer-client 206 stores the audio data 234A, 234B from each of the one or more performer-clients 202A, 202B in a playback buffer 238, as seen in FIG. 2C.

In step 324, the audio data 234 from each buffer 238 is combined into a performance track at the mixer-client 206 in such a way that the start-time stamp 232 from the live server 204 and the time stamp(s) and indication(s) of a temporal position 236 of the audio data 222 in reference to the reference track 214 from the performer-client(s) 202 are in alignment. In some such embodiments, such as shown in FIG. 2D, the mixer-client 206 manages synchronization by introducing a playback buffer based on the timestamps 232 and 236 so that each channel is playing in the synch with the other channels regardless of the how the packets of the transmitted audio were received. In certain embodiments, the mixer-client 206 receives additional audio data 248 that is combined with the performance track. In still other embodiments, the mixer-client 206 receives one or more control messages 250 that are combined with the performance track.

In step 326, the mixer-client 206 transforms the performance track into a broadcast track as indicated by block 252 of FIG. 2D. In some such embodiments, the transformation of the performance track into the broadcast track makes use of a buffer. This allows the operator of the mixer-client to adjust the combination of audio data 222, additional audio data 248, and control messages 250. In some such embodiments, transforming a performance track into a broadcast track comprises creating a stereo mix 254 of the performance track.

In certain embodiments, as indicated by step 328 of FIG. 3, the broadcast track is outputted by the mixer-client 206. In some embodiments, this involves providing the broadcast track to the live server 204 which can then provide the broadcast track. In some such embodiments, the broadcast track is provided as user datagram protocol (UDP) packets 256, as seen in FIG. 2D. The broadcast track can then be received and played by the one or more performer-clients 202, performer devices 102, and/or listener devices 108.

Figure 4:
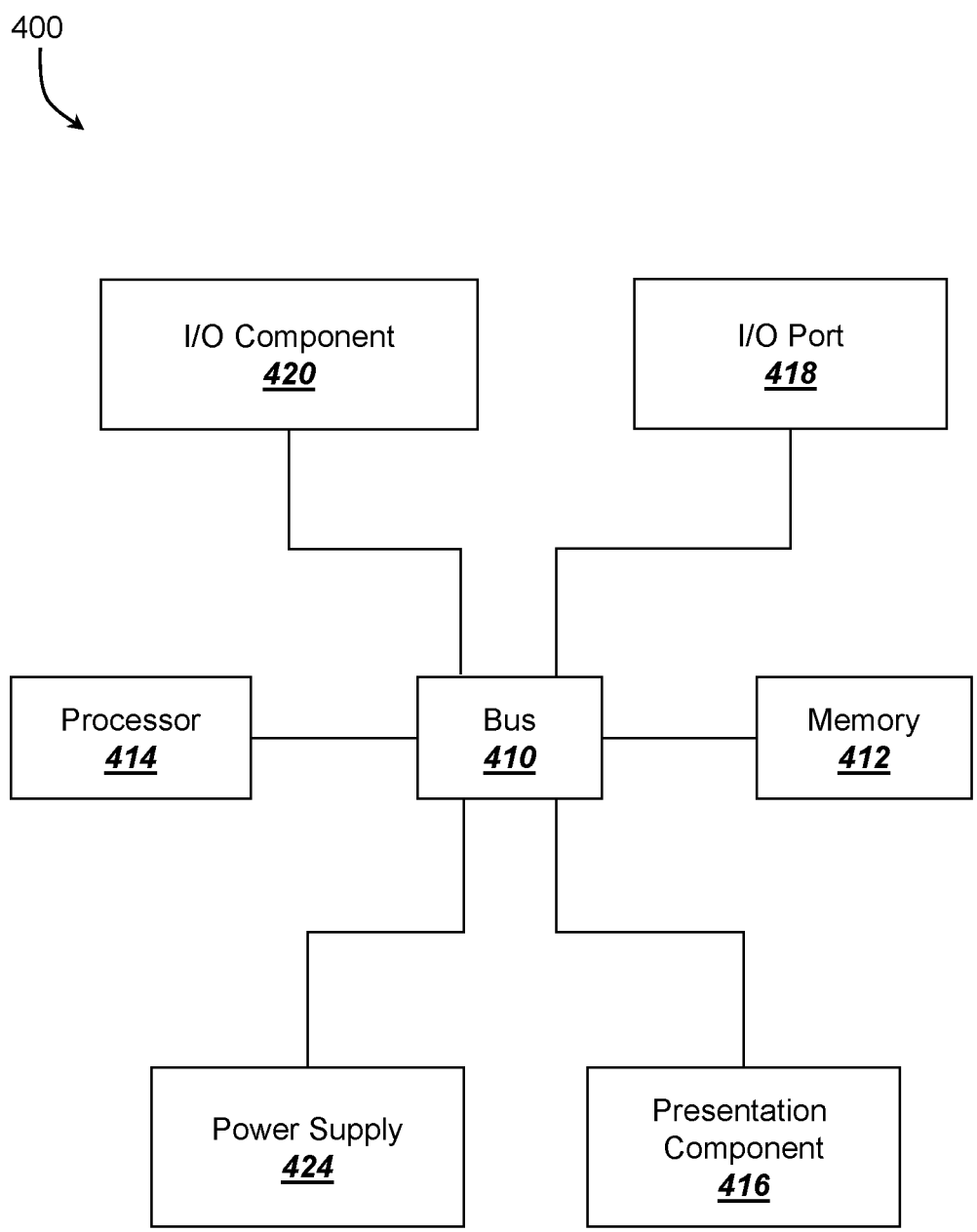
FIG. 4 is a block diagram of an electronic device used to implement a system for synchronizing audio streams in accordance with embodiments of the present invention.

Any suitable and specifically configured electronic or computing device can be used to implement the performer device 102, server 104, mixer device 106, listener device 108, and the methods/functionality described herein. One illustrative example of such an electronic or computing device 400 is depicted in FIG. 4. The computing device 400 is merely an illustrative example of a suitable computing environment and in no way limits the scope of the present invention. A "computing device," as represented by FIG. 4, can include a "workstation," a "server," a "laptop," a "desktop," or other specifically configured computing devices, as would be understood by those of skill in the art. Given that the computing device 400 is depicted for illustrative purposes, embodiments of the present invention may utilize any number of computing devices 400 in any number of different ways to implement a single embodiment of the present invention. Accordingly, embodiments of the present invention are not limited to a single computing device 400, as would be appreciated by one with skill in the art, nor are they limited to a single type of implementation or configuration of the example computing device 400.

The computing device 400 can include a bus 410 that can be coupled to one or more of the following illustrative components, directly or indirectly: a memory 412, one or more processors 414 (such as performer-client processor 216, server processor 208, and mixer-client processor 224), one or more presentation components 416, input/output ports 418, input/output components 420 (such as microphone 116, speaker 118, headphones 120, speaker 128, and headphones 130), and a power supply 424.

One of skill in the art will appreciate that the bus 410 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 4 is merely illustrative of an exemplary computing device that can be used to implement one or more embodiments of the present invention, and in no way limits the invention.

The computing device 400 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 400.

The memory 412 can include computer-storage media in the form of volatile and/or nonvolatile memory. The memory 412 may be removable, non-removable, or any combination thereof. Exemplary hardware devices are devices such as hard drives, solid-state memory, optical-disc drives, and the like. The computing device 400 can include one or more processors that read data from components such as the memory 412, the various I/O components 420, etc. Presentation component(s) 416 present data indications to a user or other device. Exemplary presentation components include a display device, speaker, printing component, vibrating component, etc.

The I/O ports 418 can enable the computing device 400 to be logically coupled to other devices, such as I/O components 420. Some of the I/O components 420 can be built into the computing device 400. Examples of such I/O components 420 include a microphone, speakers, joystick, recording device, gamepad, satellite dish, scanner, printer, wireless device, networking device, and the like.

The disclosed system and methodology result in a near real-time or live performance broadcast based on real-time audio data provided by the one or more performers. The synchronizing, combining, and transforming of supplied audio data from the one or more performer-clients into the broadcast stream occurs in near real-time with minimal delay. Thus, multiple, and potentially remote performers (as well as a sound engineer) can perform together in a live manner which is then broadcast in near real-time or live.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A streaming synchronization system, comprising:
   a server comprising a server processor, a server clock, and in communication with server data storage and a library containing one or more reference tracks;
   one or more performer-clients, comprising:
     a performer-client processor; and
     a performer-client clock;
     wherein each of the one or more performer-clients is in communication with the server, a performer-microphone and audio interface supplying performer audio data; and configured to receive and store a reference track from the server;
   a mixer-client, comprising:
     a mixer-client processor; and
     a mixer-client clock;
     wherein the mixer-client is in communication with the server and manages synchronization of the performer audio data from the one or more performer-clients into a performance track and a broadcast track;
   wherein each of the one or more performer-clients receives a reference track from the server;
   wherein one of the one or more performer-clients sends a start signal to the server and the server in response sends a start signal to each of the one or more performer-clients including a start-time stamp provided by the server clock;
   wherein in response to receiving a start signal from the server, each of the one or more performer-clients starts playback of the received reference track and receives audio data synched to the reference track and transmits the audio data to the server, the transmitted audio data including the start-time stamp from the server, a time stamp from the performer-client, and an indication of a temporal position of the audio data in reference to the reference track;
   wherein the server receives and forwards the audio data received from the one or more performer-clients to the mixer-client;
   wherein the mixer-client stores the audio data from each of the one or more performer-clients in a playback-buffer;
   wherein the audio data from each buffer is combined into a performance track at the mixer-client in such a way that the start-time stamp from the server, a time stamp from the performer-client, and an indication of a temporal position of the audio data in reference to the reference track are in alignment; and
   wherein the mixer-client transforms the performance track into a broadcast track.

2. The system of claim 1, wherein the audio data comprises user datagram protocol (UDP) packets.

3. The system of claim 1, wherein the mixer-client manages synchronization by introducing a playback buffer based on the time stamps.

4. The system of claim 1, wherein the mixer-client comprises one or more plugins for channels on a digital audio workstation (DAW).

5. The system of claim 1, wherein the mixer-client receives additional audio data that is combined with the performance track.

6. The system of claim 1, wherein the mixer-client receives one or more control messages that are combined with the performance track.

7. The system of claim 1, wherein the one or more performer-clients comprises at least a first performer-client and a second performer-client.

8. The system of claim 1, wherein the transforming a performance track into a broadcast track comprises creating a stereo mix of the performance track.

9. The system of claim 1, wherein the transformation of the performance track into the broadcast track makes use of a buffer.

10. The system of claim 1, wherein the broadcast track is outputted by the mixer-client.

11. The system of claim 1, wherein the synchronizing, combining, and transforming of supplied audio data from the one or more performer-clients into the broadcast stream occurs in near real-time with minimal delay.

12. A method for synchronizing audio streams, comprising:
   providing a server comprising:
     a server processor, and
     a server clock,
     wherein the server is in communication with server data storage and a library containing one or more reference tracks;
   providing one or more performer-clients comprising:
     a performer-client processor; and a performer-client clock;

wherein the each of the one or more performer-clients is in communication with the server, a performer-microphone and audio interface supplying performer audio data; and configured to receive and store a reference track from the server;

providing a mixer-client comprising:

a mixer-client processor; and a mixer-client clock;

wherein the mixer-client is in communication with the server and manages synchronization of the performer audio data from the one or more performer-clients into a performance track and a broadcast track;

receiving, by each of the one or more performer-clients, a reference track from the server;

sending, from one of the one or more performer-clients, a start signal to the server;

sending, by the server in response a received start signal, a start signal to each of the one or more performer-clients including a start-time stamp provided by the server clock;

starting, by each of the one or more performer-clients, in response to receiving a start signal from the server, playback of the received reference track and receiving audio data synched to the reference track;

transmitting the audio data from the one or more performer-clients to the server, the transmitted audio data including the start-time stamp from the server, a time stamp from the performer-client, and an indication of a temporal position of the audio data in reference to the reference track;

receiving, by the server, the audio data from the one or more performer-clients;

forwarding, by the server, the audio data from the one or more performer-clients to the mixer-client;

storing, by the mixer-client, the audio data from each of the one or more performer-clients forwarded by the server in a playback-buffer; and combining, at the mixer-client, the audio data from each buffer into a performance track in such a way that the start-time stamp from the server, a time stamp from the performer-client, and an indication of a temporal position of the audio data in reference to the reference track are in alignment; and transforming, by the mixer-client, the performance track into a broadcast track.

13. The method of claim 12, wherein the audio data comprises user datagram protocol (UDP) packets.

14. The method of claim 12, wherein the mixer-client manages synchronization by introducing a playback buffer based on the time stamps.

15. The method of claim 12, wherein the mixer-client comprises one or more plugins for channels on a digital audio workstation (DAW).

16. The method of claim 12, further comprising the mixer-client receiving additional audio data that is combined with the performance track.

17. The method of claim 12, further comprising the mixer-client receiving one or more control messages that are combined with the performance track.

18. The method of claim 12, wherein the one or more performer-clients comprises at least a first performer-client and a second performer-client.

19. The method of claim 12, wherein transforming a performance track into a broadcast track comprises creating a stereo mix of the performance track.

20. The method of claim 12, wherein transforming the performance track into the broadcast track makes use of a buffer.

21. The method of claim 12, further comprising the mixer-client outputting the broadcast track.

22. The method of claim 12, wherein the synchronizing, combining, and transforming of supplied audio data from the one or more performer-clients into the broadcast stream occurs in near real-time with minimal delay.

* * * * *